UNITED STATES PATENT OFFICE.

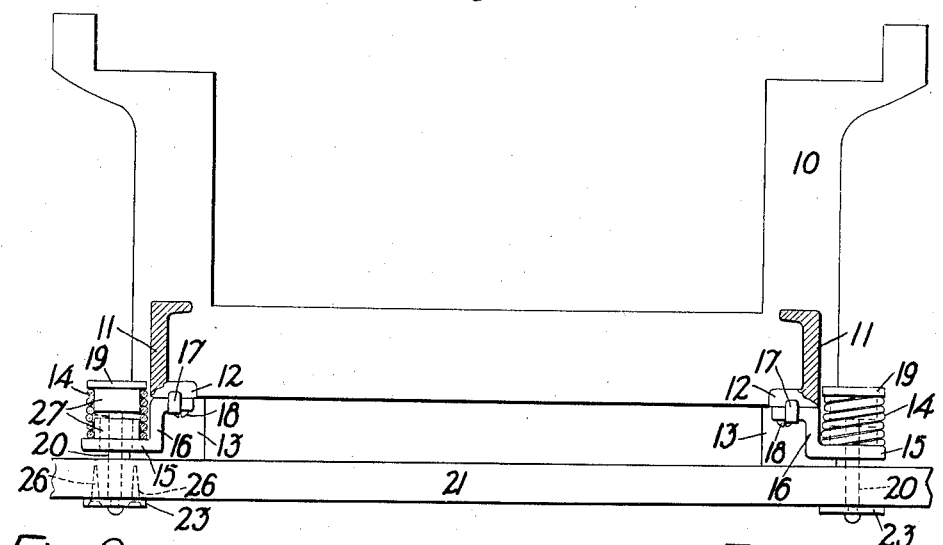

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPEWRITING-MACHINE.

1,384,532.  Specification of Letters Patent.  Patented July 12, 1921.

Application filed December 9, 1919. Serial No. 343,666.

*To all whom it may concern:*

Be it known that I, ALFRED G. F. KUROWSKI, a citizen of the United States, formerly a citizen of Germany, residing in Brooklyn borough, in the county of Kings, city and State of New York, have invented certain new and useful Improvements in Typewriting-Machines, of which the following is a specification.

This invention relates to typewriting machines, and more especially to devices for supporting such machines to decrease the shocks and noise incident to their operation.

The invention is herein disclosed as applied to an Underwood typewriting machine. Underwood typewriting machines are usually provided with resilient rubber feet by which they rest upon the desk or stand upon which they are placed, and such machines are often secured in place by bolts, or by releasable catches which are adapted to firmly hold the machines down upon these feet to secure them against displacement upon the stands.

According to the present invention, the machine may be supported upon such rubber or other resilient feet, and may be drawn down upon them by aid of springs, which are interposed between lugs upon the machine and fastening devices upon the stand, with the result that the machine is resiliently supported upon its feet and resiliently held in place against them. The devices, which are attached to the stand, may take any one of several convenient forms. One form may be a lug which is held to the stand by screws threaded into the stand. Another form may comprise a bolt extension adapted to pass through the stand and have its head caught by a slotted washer adapted to be slid over the bolt between the head of the bolt and the back of the stand. Another form may comprise a lug extending into an opening in the stand into which the lug may be drawn by a screw, said screw threaded into the lug and having its head at the back of the stand.

The spring or other resilient device may bear against the typewriter through a lug or bracket, which has extensions adapted to fit and firmly grip parts of the frame of the typewriter.

In addition to serving directly as a noise-absorbing device the springs or resilient devices allow the typewriter to yield when it receives a shock, such as the shock given by the carriage when thrown back and forth by the typist. In addition to diminishing the noise incident to this shock, the machine is less likely to be damaged, owing to the fact that its yielding slightly enables the parts that receive the shock to carry the machine along with them far enough to materially diminish the severity of the shock.

Other features and advantages will hereinafter appear.

In the accompanying drawings,

Figure 1 is a diagrammatic sectional front view of an Underwood typewriting machine frame, showing the present invention as applied thereto.

Fig. 2 is a perspective view, diagrammatically showing the resilient spring and the two lugs between which it is interposed.

Fig. 3 is a plan view of the parts seen in Fig. 2.

Fig. 4 is a plan view of an alternative form.

Fig. 5 is a side view of the parts seen in Fig. 4.

Fig. 6 is a plan view of a third form.

Fig. 7 is a sectional side view of parts seen in Fig. 6.

The Underwood typewriting machine comprises a frame 10, which has horizontal members 11, herein shown as having internally extending lugs 12, and the frame 10 is usually supported upon four resilient rubber feet 13.

According to the present invention, the frame 10 is drawn down upon the feet 13 by a spring 14, which, in Fig. 1, rests upon a bracket or support 15 having an upturned end 16, which comprises lug extensions 17 lying on opposite sides of a lug 12. The support 15 may be held to the frame by a screw 18 threaded into the lug 12.

According to the present invention, there is usually a spring 14 at each side of the machine, and said springs may be located intermediate the front and the back of the machine, so that, although the machine is supported on four feet 13, two springs 14 will draw it down upon said feet. To enable each spring 14 to draw down upon the support 15 and thereby draw down the frame 10, there rests upon the top of the spring 14, shown in Fig. 1, a plate or head 19 fast to a rod or bolt 20, which may be of uniform diameter and extend through the stand 21 upon which the feet 13 rest. To hold the head 19 down so as to compress the spring 14, the rod 20 comprises an axial or peripheral slot 22 beneath the stand 21, which is adapted to be engaged by a head or washer 23 having a nearly radial slot 24, so that the washer 23 may be slid to the Fig. 1 or Fig. 2 position, after the rod 20 has been passed through the stand 21. The washer 23 may be provided with one or more screw-holes 25 to enable screws 26 to be screwed into the back of the stand 21, to hold the washer in place.

In order to keep the spring 14 from slipping out of place, the support 15 and the head 19 may each be provided with a post or pillar 27 around which the spring 14 fits, the pillars 27 being high enough, if desired, to limit the throw of the frame 10 if the stand 21 is violently moved.

In the form of the device shown in Fig. 4, the spring 14 may rest upon a similar support 15 and bear against a head 28, said head being an upper bent-over extension of a bracket 29, which has a flat portion 30 resting upon the stand 21 and held thereto by screws 31, said screws being of sufficient strength to hold the bracket 29 to the stand. The device shown in Fig. 5 may include posts 27 having the same functions as the posts 27 of Fig. 2.

In the form of the device shown in Figs. 6 and 7, the spring 14 is very thick and fits into channels or threads 32 in a head 33 and a base 34, which are respectively secured to the frame 10 and to the stand 21. The spring 14 in Fig. 7 is a tension spring and tends to draw the head 33 downwardly to hold the frame 10 upon the feet 13. For this purpose, the head 33 may be circular and provided with a screw 35, which passes through it and through the lug 12 of the frame, thus holding the spring 14 to the frame. The base 34 may include a post 36, which is adapted to extend down into an opening 37 in the stand 21 and to be drawn down therein by a large-headed screw 38 provided with a slot 39 for a screw driver, and provided with a small lock-screw 40 which prevents it from rotating to release the base 34. It will be noted that both the head 33 and the base 34 are in the form of cups, and that they depend entirely upon the channels or threads 32 for holding the spring.

In order to limit the distance that the frame 10 may stretch the spring 14 of Fig. 7, the base 34 may rest upon a bumper or holding device, comprising a flat base 41, which rests between the base 34 and the stand 21. The bumper also comprises a hood 42, which rises outside of and overlies the edge 43 of the head 33 and limits the distance that the head 33 can be drawn away from the base 34. The bumper device 41 may be circular as illustrated in Fig. 6, and thus form an exceedingly neat-appearing device, which protects the spring 14 from becoming entangled with anything that comes into its neighborhood.

Variations may be resorted to within the scope of the invention, and portions of the improvements may be used without others.

Having thus described my invention, I claim:

1. The combination with a typewriting machine having a frame, of resilient feet upon said frame, a base upon which said feet rest, lugs on said frame, springs resting upon said lugs, and means on said springs and connected to said base for compressing the springs to press the feet to said base.

2. The combination with a typewriting machine having a frame, of resilient feet upon said frame, a base upon which said feet rest, lugs on said frame, springs resting upon said lugs, and means for compressing the springs on the lugs to press the feet to said base, said means comprising a plate connected to the base.

3. The combination with a typewriting machine having a frame, of resilient feet upon said frame, a base upon which said feet rest, lugs on said frame, springs resting upon said lugs, and means for compressing the springs on the lugs to press the feet to said base, each of said means comprising a plate connected to the base, and operable from the base to release the spring.

4. The combination with a typewriting machine having a frame, of resilient feet upon said frame, a base upon which said feet rest, lugs on said frame, springs resting upon said lugs, means for compressing the springs on the lugs to press the feet to said base, said means comprising a plate on the springs and connected to the base, and means carried by each lug and by the plate to prevent displacement of the springs.

5. The combination with a typewriting machine having a frame, of resilient feet upon said frame, a base upon which said feet rest, lugs on said frame having openings therein, springs resting upon said lugs, means for compressing the springs on the lugs to press the feet to said base, each of said means comprising a plate on the spring and connected to the base by means of a rod fixed to said plate and projecting through an opening in each lug, said rod having a circumferential slot near its lower end, and means on the under side of the base engaging the slot to hold the rod in fixed position.

6. The combination with a typewriting machine having a frame, of resilient feet upon said frame, a base upon which said feet rest, lugs on said frame having openings therein, springs resting upon said lugs, means for compressing the springs on the lugs to press the feet to said base, each of said means comprising a plate on the spring and connected to the base by means of a rod fixed to said plate and projecting through an opening in each lug, said rod having a circumferential slot near its lower end, and means on the under side of the base coöperating with said slot to hold the rod in fixed position, said last-named means comprising a washer having a substantially radial slot coöperating with the slot in the rod.

7. The combination with a typewriting machine having a frame, of resilient feet upon said frame, a base upon which said feet rest, lugs on said frame having openings therein, springs resting upon said lugs means for compressing the springs on the lugs to press the feet to said base, each of said means comprising a plate on the spring and connected to the base by means of a rod fixed to said plate and projecting through an opening in each lug, said rod having a circumferential slot near its lower end, means on the under side of the base engaging the slot to hold the rod in fixed position, and means carried by said lug and by said plate to prevent displacement of the spring.

ALFRED G. F. KUROWSKI.

Witnesses:
ELLA A. JOLIDON,
EDITH B. LIBBEY.